United States Patent
Tripp

(10) Patent No.: US 12,405,877 B1
(45) Date of Patent: Sep. 2, 2025

(54) STRING ANALYSIS IN A CODE SCANNING ENGINE

(71) Applicant: Amazon Technologies, Inc., Seattle, WA (US)

(72) Inventor: Omer Tripp, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 210 days.

(21) Appl. No.: 17/841,329

(22) Filed: Jun. 15, 2022

(51) Int. Cl.
    *G06F 9/44* (2018.01)
    *G06F 9/445* (2018.01)
    *G06F 9/455* (2018.01)
    *G06F 11/3604* (2025.01)

(52) U.S. Cl.
    CPC ...... *G06F 11/3616* (2013.01); *G06F 11/3608* (2013.01)

(58) Field of Classification Search
    CPC .......... G06F 11/3616; G06F 11/3608
    See application file for complete search history.

(56) References Cited

U.S. PATENT DOCUMENTS

| | | | | |
|---|---|---|---|---|
| 11,093,641 B1* | 8/2021 | Whalen | ................. | G06F 16/906 |
| 11,113,175 B1* | 9/2021 | Adamo | ................. | G06F 40/216 |
| 11,468,074 B1* | 10/2022 | Holub | .................... | G06N 20/00 |
| 11,663,110 B2* | 5/2023 | Dolby | ................. | G06F 11/3604 |
| | | | | 717/126 |
| 2008/0228466 A1* | 9/2008 | Sudhakar | ............ | G06F 11/3692 |
| | | | | 704/9 |
| 2012/0130983 A1* | 5/2012 | Ryan | ................. | G06F 16/90344 |
| | | | | 707/715 |
| 2012/0317143 A1* | 12/2012 | Pistoia | ................ | G06F 11/3608 |
| | | | | 707/E17.014 |
| 2016/0132415 A1* | 5/2016 | Dillard | .................. | G06F 11/263 |
| | | | | 714/33 |
| 2018/0025081 A1* | 1/2018 | Denninghoff | ....... | G06F 3/04842 |
| | | | | 707/711 |
| 2019/0146987 A1* | 5/2019 | Bhave | ................. | G06F 16/2455 |
| | | | | 709/224 |

(Continued)

FOREIGN PATENT DOCUMENTS

| | | | | | |
|---|---|---|---|---|---|
| CN | 110110163 A | * | 8/2019 | ......... | G06F 16/3331 |
| CN | 110383238 A | * | 10/2019 | .......... | G06F 11/3604 |
| CN | 110704298 A | * | 1/2020 | .......... | G06F 11/3616 |
| CN | 111240982 A | * | 6/2020 | | |
| WO | WO-2016053282 A1 | * | 4/2016 | .......... | G06F 11/3604 |

OTHER PUBLICATIONS

Fangqing Liu, Search-Based Algorithm With Scatter Search Strategy for Automated Test Case Generation of NLP Toolkit, 2019, pp. 1-13. https://ieeexplore.ieee.org/stamp/stamp.jsp?tp=&arnumber=8726151 (Year: 2019).*

(Continued)

*Primary Examiner* — Mongbao Nguyen
(74) *Attorney, Agent, or Firm* — Nicholson De Vos Webster & Elliott LLP

(57) ABSTRACT

A method for string analysis in a code scanning engine comprises a string analysis rule definition, the string analysis rule definition including a search pattern and a test criterion. At least a portion of a string in a source code file is determined to be a match to the search pattern. The test criterion is evaluated against at least a portion of the string. An indication of a result of the evaluation of the first test criterion is provided.

20 Claims, 8 Drawing Sheets

(56) References Cited

U.S. PATENT DOCUMENTS

| | | | |
|---|---|---|---|
| 2019/0205543 A1* | 7/2019 | Wei | G06F 11/3684 |
| 2020/0401502 A1* | 12/2020 | Zang | G06F 8/75 |
| 2022/0414492 A1* | 12/2022 | Jezewski | G06N 5/04 |
| 2023/0161689 A1* | 5/2023 | Walters | G06N 3/044 |
| | | | 717/124 |
| 2023/0177164 A1* | 6/2023 | Tamboli | G06F 21/16 |
| | | | 726/26 |
| 2023/0305942 A1* | 9/2023 | Thome | G06F 8/36 |

OTHER PUBLICATIONS

English translation, Munoz et al. (WO 2016053282 A1), 2016, pp. 1-12. (Year: 2016).*

Devika Sondhi, SEGATE: Unveiling Semantic Inconsistencies between Code and Specification of String Inputs, 2019, pp. 1-13. https://ieeexplore.ieee.org/stamp/stamp.jsp?tp=&arnumber=8952371 (Year: 2019).*

English translation, Hahn et al. (CN 110110163 A), 2019, pp. 1-20. (Year: 2019).*

Ranjita Bhagwan, Learning Patterns in Configuration, 2021, pp. 1-12. https://ieeexplore.ieee.org/stamp/stamp.jsp?tp=&arnumber=9678525 (Year: 2021).*

Huang et al. (CN 111240982 A), 2020, pp. 1-10. (Year: 2020).*

Leen Lambers, Model-Based Testing of Read Only Graph Queries, 2020, pp. 1-11. https://ieeexplore.ieee.org/stamp/stamp.jsp?tp=&arnumber=9155876 (Year: 2020).*

Jia et al. (CN 110704298 A), 2020, pp. 1-16. (Year: 2020).*

Steven et al. (CN 110383238 A), 2019, pp. 1-42. (Year: 2019).*

* cited by examiner

EXAMPLE RULE DEFINITION 400

```
PUBLIC RULEEVALUATIONRESULT TRUSTEDHOSTPATH(CODE) {
  FINAL CUSTOMRULE RULE = NEW CUSTOMRULE.BUILDER()
    .WITHNAME("NAME")
    .WITHCOMMENT("COMMENT")
    .WITHMETHODCALLFILTER("GETURLPARAMETER")
    .WITHDATADEPENDENTSTRANSFORM(TRUE, FALSE)
    .AS("SOURCEDEPENDENT")
    .CHECK()
    .WITHDATABYTYPEFILTER("WINDOW")
    .WITHMEMBERACCESSCHAINTRANSFORM("LOCATION", "HREF")
    .WITHARGUMENTTRANSFORM(0)
    .WITHDATABYTYPEFILTER("STRING")
    .WITHSTRINGDATAVALUEFILTER(S -> {
      FINAL STRINGPIECEPATH PHOSTPATH = S.FIRSTMATCH(SP -> {
        FINAL STRING SPSTR = SP.TOSTRING();
        RETURN SPSTR.CONTAINS("HTTPS://") && SPSTR.CONTAINS("?");    ⎫
      });                                                            ⎬ 401
      FINAL MATCHRESULT<EGROUPNODE> SOURCEDEPENDENT =
        CUSTOMRULE.WITHID("SOURCEDEPENDENT");
      FINAL STRINGPIECEPATH PUNTRUSTED = S.FIRSTMATCH(SP ->           ⎫
        SP INSTANCEOF ATOMICSTRINGPIECE && SOURCEDEPENDENT.TOSET()    ⎬ 402
          .CONTAINS(((ATOMICSTRINGPIECE) SP).GETDATA()));             ⎭
      RETURN PHOSTPATH.EXISTS() && PUNTRUSTED.EXISTS() && PHOSTPATH.PRECEDES(PUNTRUSTED);   ⎱ 403
    }, MATCHKIND.ANY)
    .BUILD();

FINAL RULEEVALUATIONRESULT RESULT = RUNRULEONJAVASCRIPTFUNCTION(RULE, CODE);
  RETURN RESULT;
};
```

401 — SEARCH PATTERN: LOCATE FIRST STRING PIECE ("PHOSTPATH") THAT CONTAINS "HTTPS://" AND "?"

402 — SEARCH PATTERN: LOCATE FIRST STRING PIECE ("PUNTRUSTED") WITH SOURCE-DEPENDENT PROPERTY

403 — TEST CRITERIA: RETURNS TRUE IF PHOSTPATH PIECE PRECEDES PUNTRUSTED PIECE

FIG. 4

STRING ANALYSIS IN A CODE SCANNING ENGINE

BACKGROUND

Companies are incorporating computers and software services into many facets of their business. These companies are using software to provide increasingly complex services. The complexity of these services has, in turn, increased the functionality required from the software that provides these services. Thus, software projects have become more complex and software development of large applications is typically a lengthy process, requiring multiple developers many months to complete development. The increased complexity in the software development process has made the task of administering and managing software challenging.

BRIEF DESCRIPTION OF DRAWINGS

Various embodiments in accordance with the present disclosure will be described with reference to the following drawings.

FIG. 4 is a diagram illustrating an annotated string analysis rule definition according to some embodiments.

DETAILED DESCRIPTION

Figure 1:
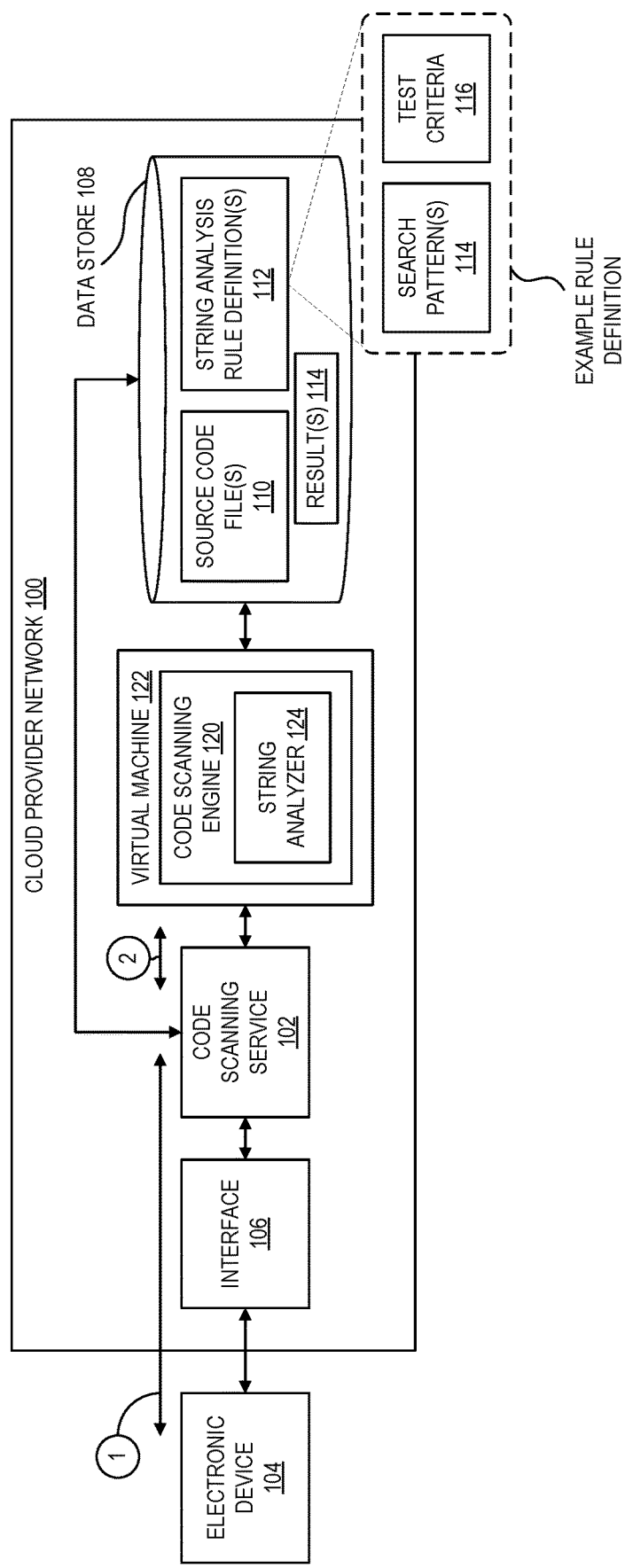
FIG. 1 is a diagram illustrating an environment for a code scanning service supporting string analysis according to some embodiments.

The present disclosure relates to methods, apparatus, systems, and non-transitory computer-readable storage media for analyzing strings in source code by a code scanning engine. Ensuring code quality is one of the most pressing problems faced by the software industry today. Lack of reliability and maintainability in production code can cause defects ranging from minor usability problems to causing an application to be unavailable for an extended period of time. Inconsistent coding practices and readability issues further delay remediation. One particularly challenging aspect of code analysis is the review of strings. Strings are nearly ubiquitous in modern applications. While the string data type is relatively straightforward—typically a sequence of characters—the flexibility of the type allows for strings to be used for an enormous variety of tasks. Exemplary string-based tasks can include forming simple messages with strings (e.g., "Hello World!"), forming strings that are messages (or message payloads) to transmit via communications protocols, forming strings that contain complicated data structures to exchange between software application programming interfaces (APIs), and forming identifiers such as a Uniform Resource Locators (URLs). The ubiquity of strings and their wide-ranging uses makes reviewing them by a code scanning service challenging.

Generally speaking, a code scanning service disclosed herein allows a developer (e.g., team(s) thereof) to improve the quality of their code and reduce the manual effort required for code analysis and auditing by taking advantage of actionable recommendations generated by the code scanning service. A code scanning service can, upon a user's request, quickly and accurately identify one or more predicted issues of source code and provide respective recommendation(s) to alleviate the predicted issues. Code scanning is often though not always a static analysis of source code, and source code is generally the code as authored by a programmer or developer in a programming language. A code scanning service uses generalized code scan rules (or simply "rules") that can be used to areas of code improvement (e.g., buggy code, bad coding practices, etc.). In this manner, a code scanning service helps users (e.g., developers) to write high quality (e.g., source) code and increases their productivity by providing recommendations during various code development stages.

Embodiments disclosed herein allow a code scanning service to analyze strings from a semantic or interpretive perspective by decomposing a string's structure into a form that can be analyzed using a comprehensive rules-based approach. A string analyzer identifies strings in source code files. The string analyzer decomposes identified strings into their constituent pieces. The decomposition of a string may also be referred to as the structure of a string. Each string can have multiple pieces, and each string can itself be a piece to another string. The string analyzer preserves properties associated with each string so that those properties remain associable with other strings that that string may be a part of. For example, a string might be formed by concatenating a fixed string with a string returned from a function call. In such a case, the string has two pieces, each piece having its own set of zero or more properties. The concatenated string can be represented as the combination of the two pieces, with the properties, if any, of each piece flowing through to or otherwise associable with the concatenated string. In this manner, strings formed from strings can be thought of as being represented by a tree-like structure. The string analyzer applies developer-defined rules to the identified strings. Rules generally include one or more search patterns to identify strings of interest and one or more test criteria for those strings of interest. Based on the evaluation of the strings by the criteria, the string analyzer generates an output (e.g., a flag of a line of code, a warning regarding a string, etc.).

FIG. 1 is a diagram illustrating an environment for a code scanning service supporting string analysis according to some embodiments. The illustrated environment includes a cloud provider network 100 (or just "cloud"), which typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use.

As illustrated, the cloud provider network 100 includes a code scanning service 102. At a high level, the code scanning service 102 allows users to initiate automated code analysis of source code files based upon one or more pre-defined or user-defined rules. The code scanning service 102 analyzes the source code against the rules and provides feedback to the user. Such feedback can be recommendations to improve code quality in the form of warnings, flags, or other indicators.

Users can interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

As indicated at circle 1, a developer (or, more generally, a user) using an electronic device 104 can submit various kinds of requests to the code scanning service 102 via an interface 106, such as an API. A variety of requests can exist including creating a new code scanning project, uploading, or otherwise adding source code files to the code scanning project, adding or editing code scan rules for the project, initiating code scans, and retrieving or otherwise receiving code scanning recommendations.

A code scanning project can be defined by metadata to identify one or more source code files (or a source code repository) to be reviewed during a code scan, to associate code scan rules with the project and whether those rules are active (e.g., run during a code scan), to identify historical code scan output results, and so on. The source code files (or repository), rules, prior outputs, and the like can be stored in a data store, which is often provided by a storage service of the cloud provider network (not shown) for the user or user's organization account. As illustrated, a data store 108 contains one or more source code files 110, one or more string analysis rule definitions 112, and code scan result(s) 114, if any. The source code file(s) 110, string analysis rule definition(s) 112, and result(s) 114 may be part of a project.

Source code files 110 may be individual files authored in various programming languages (Java, C, C++, Python, etc.) and may be grouped as part of a repository that provides developers with additional code management functionality (e.g., version control, branches, forks, etc.).

One type of request accepted by the code scanning service 102 allows for the creation (or editing) of string analysis rule definitions. As illustrated, an exemplary string analysis rule definition includes one or more search pattern(s) and one or more test criteria 116. The request can include an indication of a name for the rule (or of the rule to be edited), new or edited search pattern(s), and new or edited test criteria. The search pattern can be specified using a regular expression or other domain specific language that can be used to search for patterns of interest in strings in the source code files during a code scan. For example, a regular expression "^https://.*" can be used to search for a string starting with the "https://" and followed by some number of characters. A test criterion can also be specified in code or other domain specific language and generally includes some form of logical expression. Exemplary criterion include checking the absolute position of a match to a search pattern, checking the relative position of matches of two search patterns, checking for multiple occurrences of a match to a search pattern, checking for the presence of multiple matches to multiple search patterns, checking the properties of a string piece or pieces that fall within a match to a search pattern, and so on. (String pieces and properties are describes in further detail with reference to FIG. 2.)

Another type of request accepted by the code scanning service 102 allows for the initiation of a code scan. Such a request can include an identification of a project, and the code scanning service 102 can evaluate the metadata associated with the project to determine which file(s) to review against which rules. Alternatively, the request can include an indication of a location of a source code file or files to be reviewed and an indication of a location of a string analysis rule definition or definition(s) to apply during the review. In some embodiments, upon receipt of a request to initiate a code scan, the code scanning service 102 will launch a code scanning engine 120 on a virtual machine 122, as indicated at circle 2. The code scanning engine 120 is typically a software program that applies string analysis rule definition(s) to strings identified in source code. The code scanning engine 120 can still be considered part of the code scanning service 102.

To provide computing resource services to their customers, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

The code scanning service 102 can request the launch of a virtual machine to host the code scanning engine 120 from such a hardware virtualization service. As indicated above, the code scanning engine 120 may perform a variety of code scanning operations. Here, the code scanning engine 120 includes a string analyzer 124 component or module that allows for the more comprehensive review of strings. At a high level, the string analyzer 124 exposes the structure of strings found in code such that developers can author rules in a query-like form to search for and evaluate strings of interest.

Although the code scanning engine 120 is illustrated and described as part of a service of the cloud provider network 100 in FIG. 1, the code scanning engine can be deployed in a variety of other environments. For example, the code scanning engine may be implemented as part of a build workflow, as part of an offline scanning workflow (e.g., executed locally on a developer's machine), as part of a code deployment pipeline, as part of a check-in workflow in for a code repository, etc.

Figure 2:
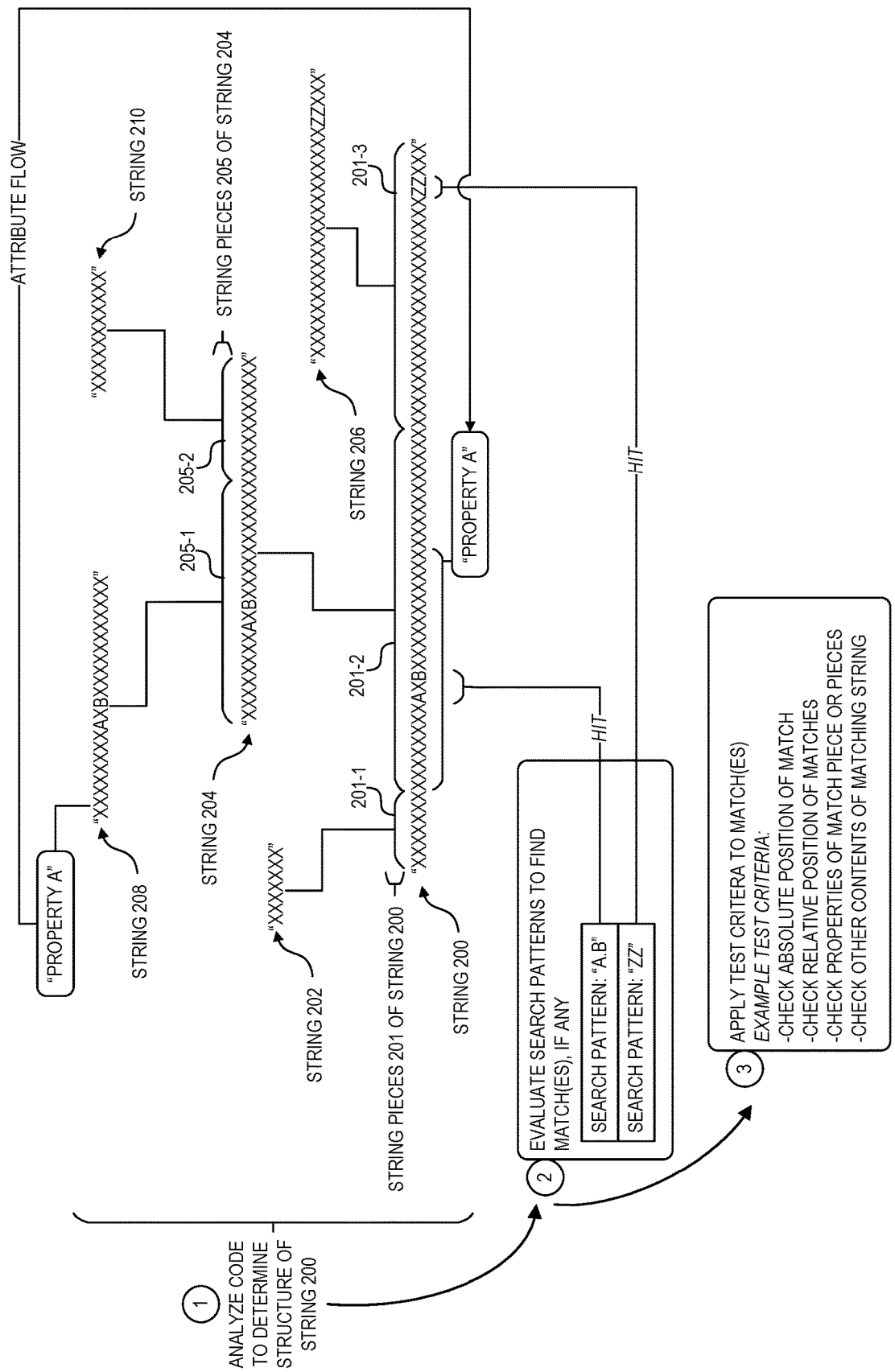
FIG. 2 is a diagram illustrating an overview of string analysis operations in a code scanning service according to some embodiments.

FIG. 2 is a diagram illustrating an overview of string analysis operations in a code scanning service according to some embodiments. These operations are typically carried out by the string analyzer 124 of FIG. 1. One such operation is the analysis of source code files to generate a string's structure, as indicated at circle 1. The string's structure can be thought of as a decomposition of the string into its constituent or component parts. The possible lineage of strings in source code can range from simple (e.g., a string constant "Hi!") to complex (e.g., a substring of a string output from a function that was sandwiched between header and footer strings, a JSON string constructed from having a series of key-value pairs according to some API, etc.).

Generating a structure representing the string's lineage allows the string analyzer 124 to evaluate string-based rules at granular level.

An example lineage of a string 200 is illustrated at the top of FIG. 2. In this example, string 200 is composed of three string "pieces" 201-1, 201-2, and 201-3. String pieces are parts of a string and can themselves be strings. Here, string piece 201-1 is string 202, string piece 201-2 is string 204, and string piece 201-3 is string 206. String 200 might also be a string piece to another string (not shown). While strings 202 and 206 are themselves not composed of string pieces (e.g., they could have been declared as constants), string 204 is composed of string pieces 205-1 and 205-2. Again, string pieces 205 can themselves correspond to strings. Here, string piece 205-1 is string 208 and string piece 205-2 is string piece 210.

As described in further detail with reference to FIG. 3, the string analyzer 124 generates a structure of string in a manner such that properties associated with each string that is a string piece of another string are attributable to that corresponding portion of the other string. For example, a property of string 208 would be attributable to the corresponding portion of string piece 201-2 of string 200, as indicated (and also to the string piece 205-1 portion of string 204). In other words, properties of the piece or pieces forming at least a portion of a string flow through to that portion such that those properties are associated with the respective portion of the string. String properties generally include information related to the origin of the string (e.g., whether a constant, whether based on user input, whether the output of a function, string length, etc.).

The string analyzer 124 allows these string structures to be queryable by the user as specified by string analysis rule definitions. As mentioned, such definitions typically have at least a search pattern and a test criteria. At a high level, the search pattern allows the user to describe strings of interest that should be matched by the string analyzer 124, while the test criteria allows the user to describe how the string analyzer 124 should evaluate those strings of interest (e.g., to check for "bad" code, unsecure code, code that deviates from organizational conventions, etc.)

The string analyzer 124 searches for strings in the source code that match to the string pattern(s) specified in the string analysis rule definitions, as indicated at circle 2. As shown, a search pattern for "A" and "B" separated by one character "A.B" would result in a match in string 200 (and, although not shown, matches in string 208 and string 204). Likewise, a search pattern for the characters "ZZ" in sequence would result in a match in string 200 (and, although not shown, a match in string 206).

The string analyzer 124 also evaluates test criterion specified in the string analysis rule definitions, as indicated at circle 3. Test criteria are typically specified in some form of logical expression (e.g., A and (B or C) and not D). Test criterion can be evaluated against a string portion or portions matching a search pattern or other portions of strings that were identified using the search pattern. In other words, search patterns identify strings of interest, and test criterion can be evaluated against the matching portion or any other portion of a string of interest. Example criterion include checking the position of a match, checking the relative position of multiple matches, checking properties of a string or portion of a string (e.g., a piece) of interest, checking the other contents of a string of interest, etc.

Figure 3:
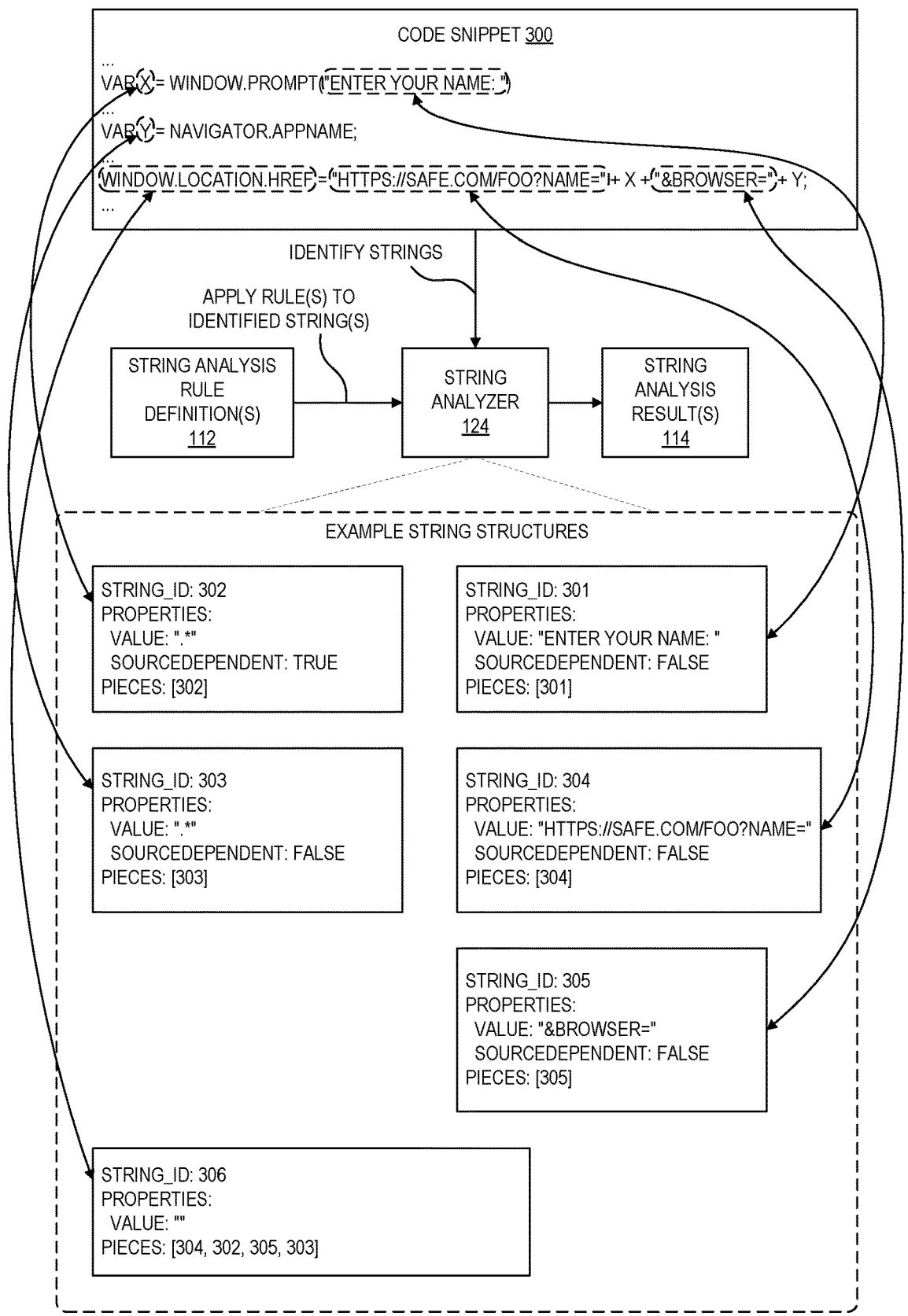
FIG. 3 is a diagram illustrating an example string analysis structure of a code sample according to some embodiments.

FIG. 3 is a diagram illustrating an example string analysis structure of a code sample according to some embodiments. In this example, a code snippet 300 forms a string, WIN- DOW.LOCATION.HREF, based on the concatenation of a first string constant ("HTTPS://SAFE.COM/FOO-?NAME="), a second string, X, which is the return value of a function (WINDOW.PROMPT( )), a third string constant ("&BROWSER="), and a fourth string, Y, which is the string property APPNAME of a NAVIGATOR object.

One example technique for determining the underlying structure of a string is as follows. The string analyzer 124 creates string analysis objects for strings identified in the source code file(s). A string analysis object includes an identifier, zero or more properties, and an ordered list of string analysis object identifiers that form the pieces of the string analysis object, if any. The string analysis objects form the building blocks for the defining string structures. The string analyzer 124 can identified strings in the source code file(s) directly (e.g., often delimited by double-quotes in many languages) or indirectly (a return value of a function, a result of an operation, etc.).

Here, the string analyzer creates six string analysis objects identified 301 through 306. String analysis object 301 corresponds to the constant string "ENTER YOUR NAME:" included as a parameter to the WINDOW.PROMPT function. String analysis object 301 includes a value property corresponding to its value and a SOURCEDEPENDENT property, which indicates whether the string is modifiable by an end-user or other untrusted source. As a constant string, the SOURCEDEPENDENT property is set to FALSE. String analysis object 301 further includes its identifier in the ordered list of string analysis object identifiers.

String analysis object 302 corresponds to the return value of the WINDOW.PROMPT function. String analysis object 301 includes a value property having a wildcard placeholder (.*) since the value of the string cannot be determined during a static analysis of code (that is, it only obtains a value during runtime based on user input). Because the value can be modified, the SOURCEDEPENDENT property is set to TRUE. String analysis object 302 further includes its identifier in the ordered list of string analysis object identifiers.

String analysis object 303 corresponds to the APPNAME property of a NAVIGATOR object. String analysis object 303 includes a value property having a wildcard placeholder (.*), again, because the value of the string cannot be determined during a static analysis of code. Because the value is unlikely to be modified by a user, the SOURCEDEPENDENT property is set to FALSE (although this assumption may be changed). String analysis object 303 further includes its identifier in the ordered list of string analysis object identifiers.

String analysis object 304 corresponds to the first string constant in the concatenation operation forming WINDOW.LOCATION.HREF. String analysis object 304 includes a value property corresponding to its value and a SOURCEDEPENDENT property set to false (as a constant string). String analysis object 304 further includes its identifier in the ordered list of string analysis object identifiers.

String analysis object 305 corresponds to the second string constant in the concatenation operation forming WINDOW.LOCATION.HREF. String analysis object 305 includes a value property corresponding to its value and a SOURCEDEPENDENT property set to false (as a constant string). String analysis object 305 further includes its identifier in the ordered list of string analysis object identifiers.

String analysis object 306 corresponds to the string WINDOW.LOCATION.HREF. String analysis object 305 includes an empty value property as it is formed from the values of its string pieces. String analysis object 305 further includes the identifiers 304, 302, 305, 303 in its ordered list of string analysis object identifiers.

The string analyzer 124 may create and store the string analysis objects in a database to allow the string analyzer 124 to easily locate and access string pieces.

The string analyzer 124 evaluates the string analysis rules specified in the string analysis rule definitions 112 against the string structures. For example, a string analysis rule definition 112 that includes a search pattern for "http" would match string analysis objects 304 and 306.

In some embodiments, the code scanning engine 120 compiles and links objects within the source code prior to the string analyzer 124 generating string structures so as to allow the lineage of strings to be traced across files (e.g., a return value from a function defined in a library, a string passed as a parameter to a function call, etc.). For example, the code scanning engine 120 may make a call to compiler and linker programs used during a build process, or incorporate such functionality directly.

In some embodiments, the string analyzer 124 preprocesses all of the strings in the source code file(s) prior to evaluating string analysis rules.

FIG. 4 is a diagram illustrating an annotated string analysis rule definition according to some embodiments. As shown, the example rule definition 400 is authored by a developer or other user of the code scanning service in a programming language such as a query language. In other embodiments, the code scanning service may provide a graphical user interface via which a developer or user can construct string analysis rules. Rule definition 400 is a function that operates on a code object and returns an output result. A rule is built through a series of operations that include things like naming the rule (.WITHNAME( )), commenting the rule (.WITHCOMMENT( )), etc., Of note, the operation "WITHSTRINGDATAFILTERS" supports the definition of a code analysis rule. In particular, a first search pattern, search pattern 401, that locates the first occurrence in a string of "HTTPS://" followed by a question mark "?". Another search pattern, search pattern 402, locates the first occurrence in a string of a string piece having SOURCEDEPENDENT property set to TRUE. A test criterion, test criterion 403, checks whether the string includes both the first search pattern, the second search pattern, and whether the location of the match of the first search pattern precedes the location of the match of the second search pattern. Such a rule is useful to ensure that URLs cannot be modified maliciously or inadvertently and thereby redirect a user somewhere unintended.

Figure 5:
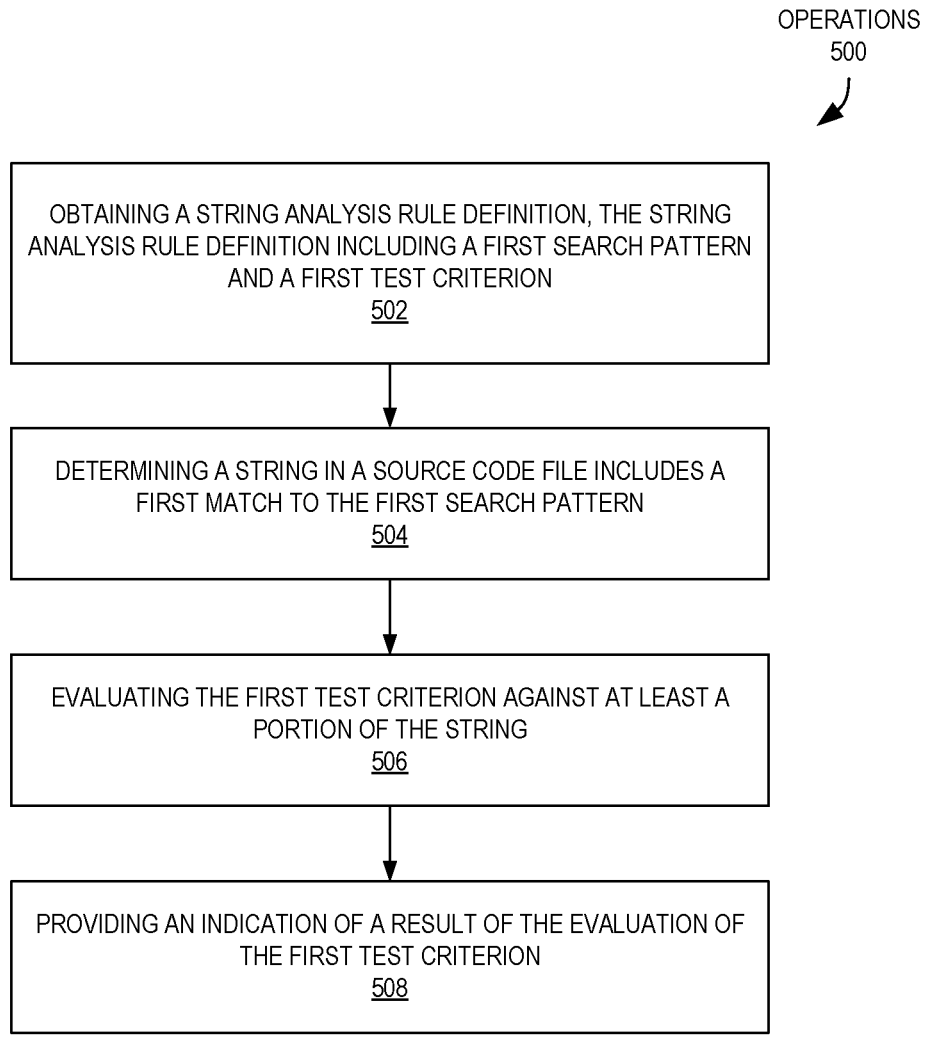
FIG. 5 is a flow diagram illustrating operations of a method for analyzing strings by a code scanning service according to some embodiments.

FIG. 5 is a flow diagram illustrating operations of a method for analyzing strings by a code scanning service according to some embodiments. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 500 are performed by the code scanning service 102, the code scanning engine 120, and/or the string analyzer 124 of the other figures.

The operations 500 include, at block 502, obtaining a string analysis rule definition, the string analysis rule definition including a first search pattern and a first test criterion. Such an operation may be implemented by the code scanning engine, including as part of a code scanning service, as part of a build workflow, as part of an offline scanning workflow (e.g., executed locally on a developer's machine), as part of a code deployment pipeline, or as part of a check-in workflow in for a code repository.

The operations 500 further include, at block 504, determining that a string in a source code file includes a first match to the first search pattern.

The operations 500 further include, at block 506, evaluating the first test criterion against at least a portion of the string. The test criterion generally includes some form of logical expression to pass/fail the string. As described herein, the expression may be based on the contents of the string, the presence or absence of a match in the string, the relative location of multiple matches in the string, the properties of portions of the string, etc.

The operations 500 further include, at block 508, providing an indication of a result of the evaluation of the first test criterion. The indication can be provided to the initiator of the operations, such as a developer or other user that initiated a code scanning analysis of the strings in the source code file(s).

Figure 6:
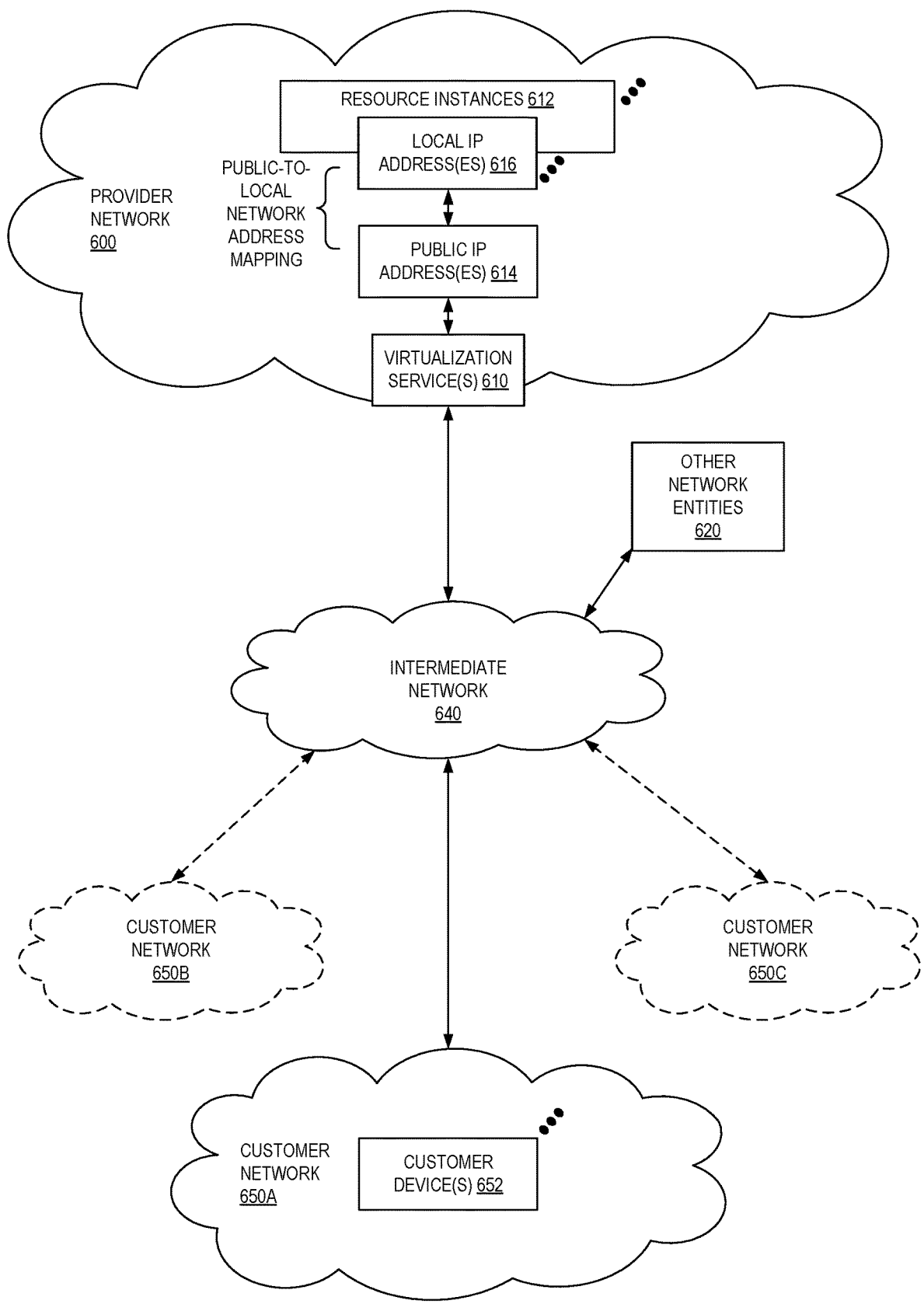
FIG. 6 illustrates an example provider network environment according to some embodiments.

FIG. 6 illustrates an example provider network (or "service provider system") environment according to some embodiments. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some embodiments, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
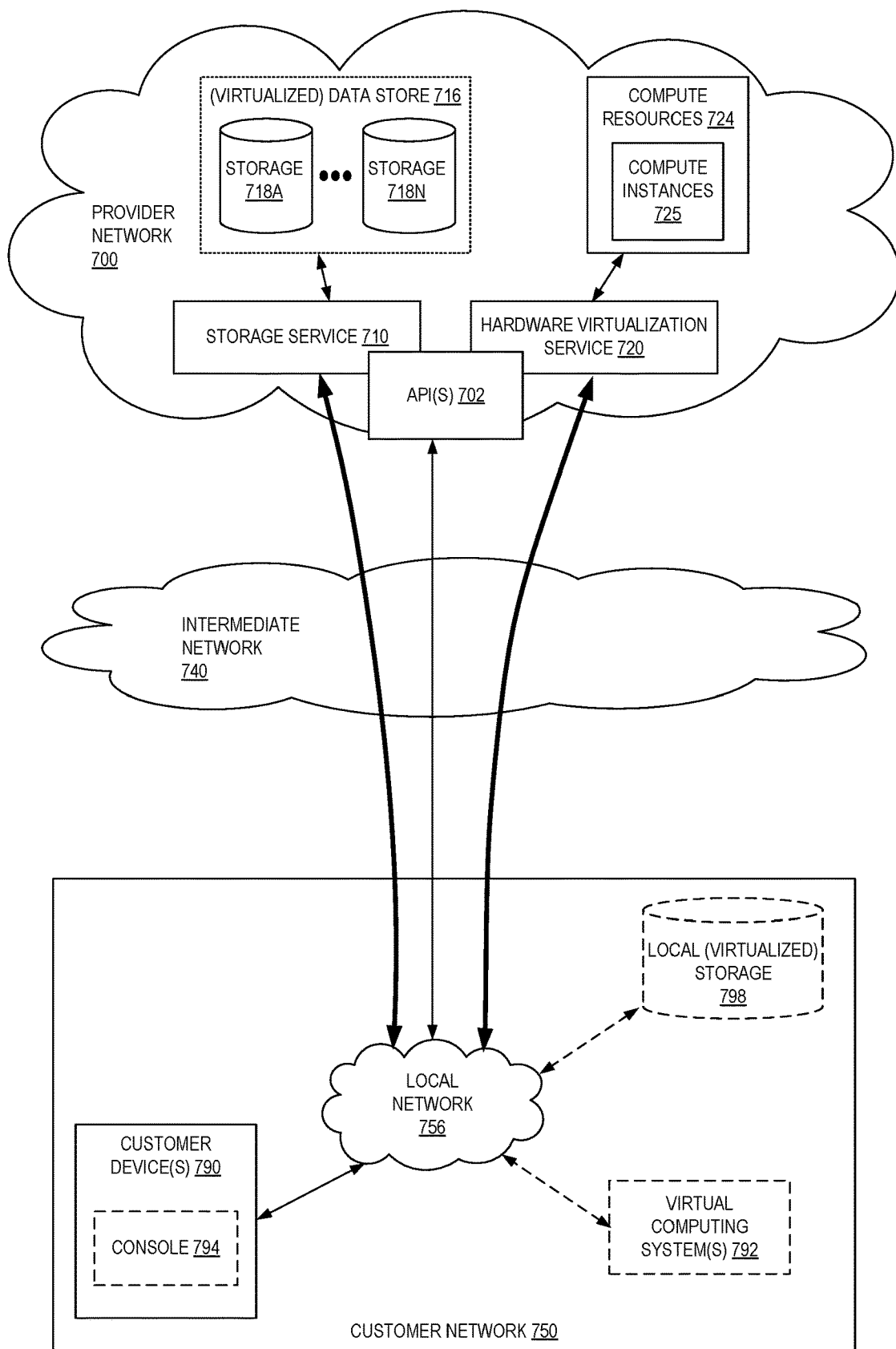
FIG. 7 is a block diagram of an example provider network that provides a storage service and a hardware virtualization service to customers according to some embodiments.

FIG. 7 is a block diagram of an example provider network environment that provides a storage service and a hardware virtualization service to customers, according to some embodiments. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some embodiments, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some embodiments, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some embodiments, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some embodiments, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Illustrative Systems

Figure 8:
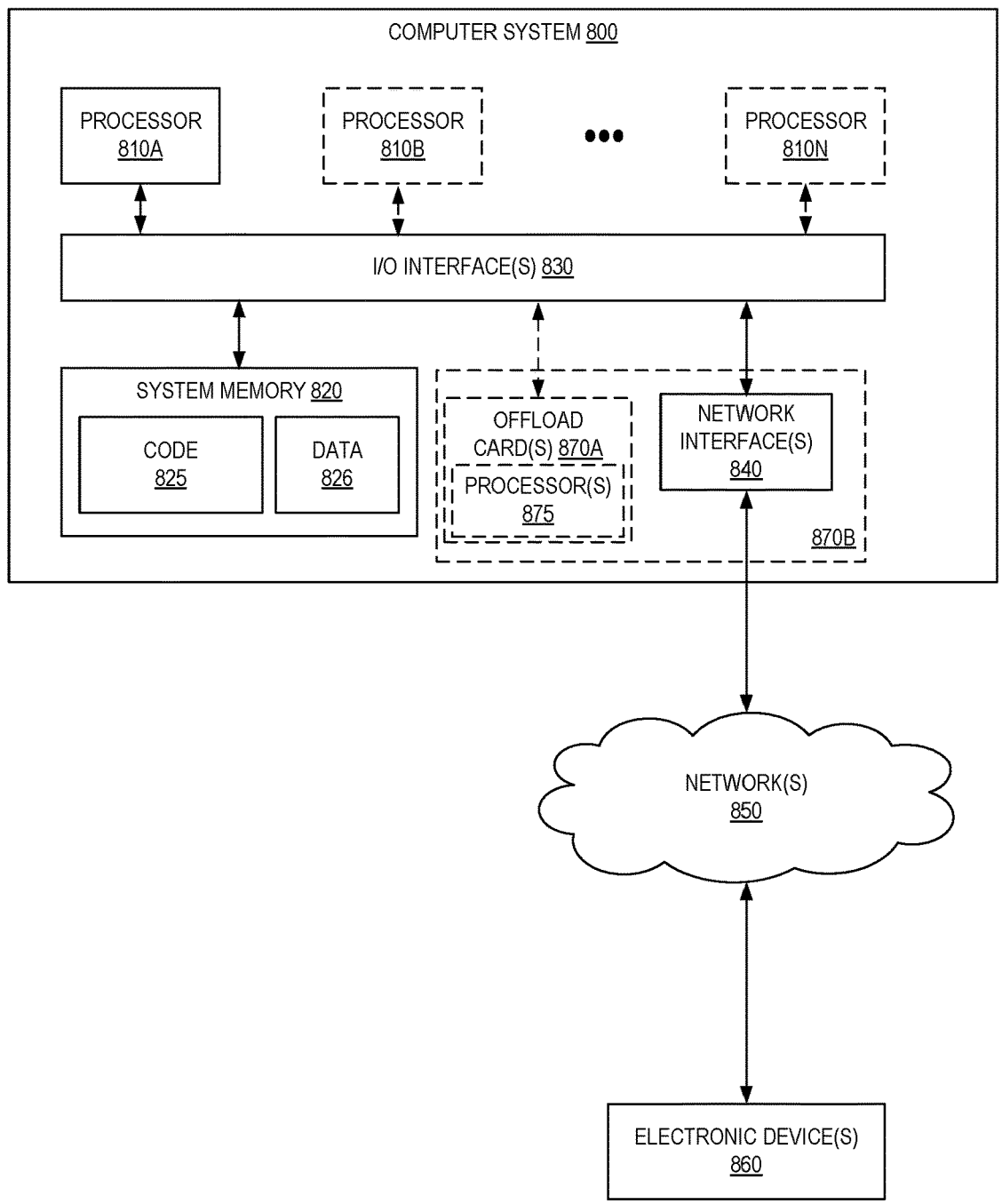
FIG. 8 is a block diagram illustrating an example computer system that can be used in some embodiments.

In some embodiments, a system that implements a portion or all of the techniques described herein can include a general-purpose computer system, such as the computer system 800 illustrated in FIG. 8, that includes, or is configured to access, one or more computer-accessible media. In the illustrated embodiment, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various embodiments the computer system 800 can include one computing device or any number of computing devices configured to work together as a single computer system 800.

In various embodiments, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various embodiments, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various embodiments, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 820 as code 825 (e.g., executable to implement, in whole or in part, the code scanning service 102, the code scanning engine 120, the string analyzer 124) and data 826.

In some embodiments, the I/O interface 830 can be configured to coordinate I/O traffic between the processor 810, the system memory 820, and any peripheral devices in the device, including the network interface 840 and/or other peripheral interfaces (not shown). In some embodiments, the I/O interface 830 can perform any necessary protocol, timing, or other data transformations to convert data signals from one component (e.g., the system memory 820) into a format suitable for use by another component (e.g., the processor 810). In some embodiments, the I/O interface 830 can include support for devices attached through various types of peripheral buses, such as a variant of the Peripheral Component Interconnect (PCI) bus standard or the Universal Serial Bus (USB) standard, for example. In some embodiments, the function of the I/O interface 830 can be split into two or more separate components, such as a north bridge and a south bridge, for example. Also, in some embodiments, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various embodiments, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations, such as pausing and/or un-pausing compute instances, launching and/or terminating compute instances, performing memory transfer/copying operations, etc. These management operations can, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and cannot coordinate with (or service) any separate hypervisor.

In some embodiments, the system memory 820 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters (e.g., 718A-718N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method for scanning a source code file, the method comprising:
    obtaining, by a code scanning service implemented as code executed by one or more processors of a cloud provider network, a string analysis rule definition, the string analysis rule definition including a first search pattern, a second search pattern, and a first test criterion, wherein the first search pattern is a regular expression and wherein the first test criterion is a logical expression evaluated against at least a portion of a string matching the first search pattern;
    compiling, by the code scanning service, objects within the source code file;
    obtaining, by the code scanning service, a request to perform a code scan on the source code file using the string analysis rule definition;
    generating a string structure of a first string in the source code file, the string structure including a plurality of string pieces, each string piece having zero or more properties, wherein the first string is a sequence of characters, and wherein each string piece is a sequence of characters;
    determining that a first portion of the first string is a first match to the first search pattern, wherein the first string is associated with a first string piece of the plurality of string pieces;

determining that a second portion of the first string is a second match to the second search pattern;

evaluating the first test criterion against a property of the first string piece, wherein the first test criterion evaluates a relative position of the first match to the second match within the first string; and providing an indication of a result of the evaluation of the first test criterion.

2. The computer-implemented method of claim 1, wherein the property of the first string piece is whether the first string piece is based at least in part on an untrusted input.

3. The computer-implemented method of claim 1, wherein each string piece of the plurality of string pieces is another string found in the source code file.

4. A computer-implemented method for scanning a source code file, the method comprising:

obtaining, by a code scanning service implemented as code executed by one or more processors of a cloud provider network, a string analysis rule definition, the string analysis rule definition including a first search pattern, a second search pattern, and a first test criterion;

compiling, by the code scanning service, objects within the source code file;

generating a string structure of a string in the source code file, the string structure including a plurality of string pieces, each string piece having zero or more properties, wherein the string is a sequence of characters, and wherein each string piece is a sequence of characters;

determining that a first portion of the string is a first match to the first search pattern;

determining that a second portion of the string is a second match to the second search pattern;

evaluating the first test criterion against at least a portion of the string, wherein the first test criterion evaluates a relative position of the first match to the second match within the string; and providing an indication of a result of the evaluation of the first test criterion.

5. The computer-implemented method of claim 4, wherein the portion of the string is associated with a first string piece of the plurality of string pieces.

6. The computer-implemented method of claim 5, wherein evaluating the first test criterion against at least a portion of the string comprises evaluating the first test criterion against a property of the string inherited from the first string piece.

7. The computer-implemented method of claim 6, wherein the property of the first string piece is whether the first string piece is based at least in part on an untrusted input.

8. The computer-implemented method of claim 4, further comprising generating a string structure for each other string in the source code file, each string structure referencing zero or more string pieces.

9. The computer-implemented method of claim 4, wherein the string analysis rule definition further includes a second search pattern and further comprising:

determining that at least a second portion of the string is a second match to the second search pattern; and wherein the first test criterion evaluates a relative position of the first match to the second match within the string.

10. The computer-implemented method of claim 4, wherein the first search pattern is a regular expression and wherein the first test criterion is a logical expression to be evaluated against at least a portion of a string including a match to the first search pattern.

11. The computer-implemented method of claim 4, further comprising obtaining a request to perform a code scan on the source code file using the string analysis rule definition prior to determining that the string in the source code file includes the first match to the first search pattern.

12. The computer-implemented method of claim 4, wherein the determining that the string in the source code file includes the first match to the first search pattern is performed by a virtual machine of a cloud provider network.

13. The computer-implemented method of claim 4, wherein the indication is provided as part of a code review workflow, a code build workflow, a code deployment pipeline workflow, or an offline scanning workflow.

14. The computer-implemented method of claim 4, wherein the string analysis rule definition is authored in a query language.

15. A system for scanning a source code file, the system comprising:

a first one or more electronic devices to implement a data store; and a second one or more electronic devices to implement a code scanning service, the code scanning service including instructions that upon execution by one or more processors cause the code scanning service to:

obtain a string analysis rule definition from the data store, the string analysis rule definition including a first search pattern, a second search pattern, and a first test criterion;

compile objects within the source code file;

generate a string structure of a string in the source code file, the string structure including a plurality of string pieces, each string piece having zero or more properties, wherein the string is a sequence of characters, and wherein each string piece is a sequence of characters;

determine that a first portion of the string is a first match to the first search pattern;

determine that a second portion of the string is a second match to the second search pattern;

evaluate the first test criterion against at least a portion of the string, wherein the first test criterion evaluates a relative position of the first match to the second match within the string; and provide an indication of a result of the evaluation of the first test criterion.

16. The system of claim 15, wherein the portion of the string is associated with a first string piece of the plurality of string pieces.

17. The system of claim 16, wherein to evaluate the first test criterion against at least a portion of the string comprises an evaluation of the first test criterion against a property of the string inherited from the first string piece.

18. The system of claim 17, wherein the property of the first string piece is whether the first string piece is based at least in part on an untrusted input.

19. The system of claim 15, wherein the code scanning service includes further instructions that upon execution cause the code scanning service to generate a string structure for each other string in the source code file, each string structure referencing zero or more string pieces.

20. The system of claim 15, wherein the string analysis rule definition further includes a second search pattern, and wherein the code scanning service includes further instructions that upon execution cause the code scanning service to determine that at least a second portion of the string is a second match to the second search pattern, wherein the first test criterion evaluates a relative position of the first match to the second match within the string.

* * * * *